United States Patent [19]

Epple

[11] Patent Number: 4,640,472

[45] Date of Patent: Feb. 3, 1987

[54] TORQUE COMPENSATING SPRING ARRANGEMENT FOR SEAT BELT RETRACTOR

[75] Inventor: Peter C. Epple, Russelsheim/Konigstadten, Fed. Rep. of Germany

[73] Assignee: General Motors Corporation, Detroit, Mich.

[21] Appl. No.: 808,062

[22] Filed: Dec. 12, 1985

[51] Int. Cl.⁴ .............................................. B65H 75/48
[52] U.S. Cl. .................................. 242/107; 242/107.5
[58] Field of Search ................... 242/107.5, 107, 107.6; 185/37, 39

[56] References Cited

U.S. PATENT DOCUMENTS

| | | | |
|---|---|---|---|
| 1,369,197 | 2/1921 | Serrurier | 242/107 |
| 2,596,648 | 5/1952 | Bugg | 242/107.5 |
| 3,682,412 | 8/1972 | Kuszynski | 242/107.6 |
| 3,984,063 | 10/1976 | Knieriemen | 242/107 |
| 3,997,126 | 12/1976 | Karlsson | 242/107 |
| 4,036,449 | 7/1977 | Schreiber | 242/107 |
| 4,061,291 | 12/1977 | Cunningham | 242/107 |
| 4,097,003 | 6/1978 | Stouffer | 242/107 |
| 4,099,683 | 7/1978 | Stouffer | 242/107 |
| 4,216,922 | 8/1980 | Weman | 242/107 |
| 4,301,977 | 11/1981 | Yang | 242/107 |
| 4,427,163 | 1/1984 | Kondziola | 242/107 |

Primary Examiner—Stuart S. Levy
Assistant Examiner—Katherine Matecki
Attorney, Agent, or Firm—Charles E. Leahy

[57] ABSTRACT

A seat belt retractor according to the present invention includes a belt reel rotatably mounted on the side walls of a frame by a reel shaft. The reel is biased in the belt winding direction by a windup spring such as a clock spring or spiral spring having its inner end attached to the reel shaft and its outer end mounted on a gear which is coupled to the reel by a reduction gear arrangement by which the gear makes less than one revolution during the plurality of revolutions of the reel experienced during belt unwinding from the fully retracted condition to the fully extended condition for buckling about the occupant. The outer end of the winding spring is mounted on the gear at a location furthest away from the inner end of the spring so that during the plurality of belt unwinding revolutions of the inner end of the spring the outer end of the spring chases the inner end of the spring in the direction to relieve the force on the spring and also moves closer to the inner end of the spring so that the torque acting on the reel via the lever arm provided by the gear progressively increases during belt unwinding to lessen the belt winding effort imposed on the belt by the spring.

3 Claims, 6 Drawing Figures

TORQUE COMPENSATING SPRING ARRANGEMENT FOR SEAT BELT RETRACTOR

The invention relates to a seat belt retractor having a winding spring and more particularly provides a winding spring arrangement by which the output torque of the winding spring acting to rewind the belt is lessened as the belt is fully extended to its use position about the seated occupant.

BACKGROUND OF THE INVENTION

It is known to provide a seat belt retractor wherein a winding spring biases a belt reel in the direction to wind the belt on the reel. The winding spring is conventionally a spiral or clock spring having one end mounted on the reel shaft and the other end mounted on the retractor housing. As the reel is rotated in the belt unwinding direction by belt extension, energy is stored in the spring for biasing the reel in the belt rewinding direction.

It is characteristic of the aforedescribed conventional seat belt retractor that when the belt is fully unwound and engaged in the restraining position about the seated occupant, the winding spring is fully wound up and provides its highest level of winding bias on the reel. This occurs because, as the belt is unwound from its fully wound position, the winding spring is increasingly wound up so that it initially provides a relatively smaller torque on the reel and proceeds to a tightly wound condition wherein a relatively higher biasing torque is provided on the reel so that the tension on the belt increases. Furthermore, as the belt is progressively extended and unwound from the reel, the diameter of belt wound on the reel is reduced and progressively diminishes the moment arm through which the spring torque acts upon the belt so that the tension on the belt increases.

It is known that a relatively high biasing effort on a seat belt tensions the belt against the occupant and may be uncomfortable. It is therefore desirable to provide a winding spring which imparts a relatively modest winding bias on the reel when the belt is unwound to the restraining position so that the belt is not uncomfortably tensioned across the body of the seated occupant. It has been found that a winding spring having this desired characteristic may not be sufficient in strength to completely wind the seat belt on the reel and fully retract the belt from its restraining position to its stored position.

SUMMARY OF THE INVENTION

A seat belt retractor according to the present invention includes a belt reel rotatably mounted on the side walls of a frame by a reel shaft. The reel is biased in the belt winding direction by a windup spring such as a clock spring or spiral spring having its inner end attached to the reel shaft on gear driver coupled thereto and its outer end mounted on a gear which is coupled to the reel by a reduction gear arrangement by which the gear makes less than one revolution during the plurality of revolutions of the reel experienced during belt unwinding from the fully retracted condition to the fully extended condition for buckling about the occupant. The outer end of the winding spring is mounted on the gear at a location furthest away from the inner end of the spring so that during the plurality of belt unwinding revolutions of the inner end of the spring the outer end of the spring chases the inner end of the spring in the direction to relieve the force on the spring and also moves closer to the inner end of the spring so that the torque acting on the reel via the lever arm provided by the gear progressively increases during belt unwinding to lessen the belt winding effort imposed on the belt by the spring.

Accordingly, the object, feature and advantage of the invention resides in the provision of a seat belt winding spring arrangement in which the inner end of the spiral spring rotates in unison with the reel shaft and the outer end of the spring is mounted on a gear driven through the gear reduction set by which the outer end of the spring acts through the gear to provide a progressively increasing force on the reel counteracting the winding bias of the inner end of the spring as the belt unwinding progresses from a fully wound to a fully unwound condition.

A further object, feature and advantage of the invention resides in the provision of a reel driven gear reduction set carrying the outer end of a spiral wound spring having its inner end connected to the reel so that the outer end of the spring chases after the inner spring and the outer end moves progressively closer to the inner end so that the gear reduction set imposes on the reel a progressively increasing force counteracting the belt winding bias of the inner end of the spring.

BRIEF DESCRIPTION OF THE DRAWINGS

These and other objects, features and advantages of the invention will become apparent upon consideration of the following description of the preferred embodiment and the drawings in which.

DESCRIPTION OF THE PREFERRED EMBODIMENT

Figure 1:
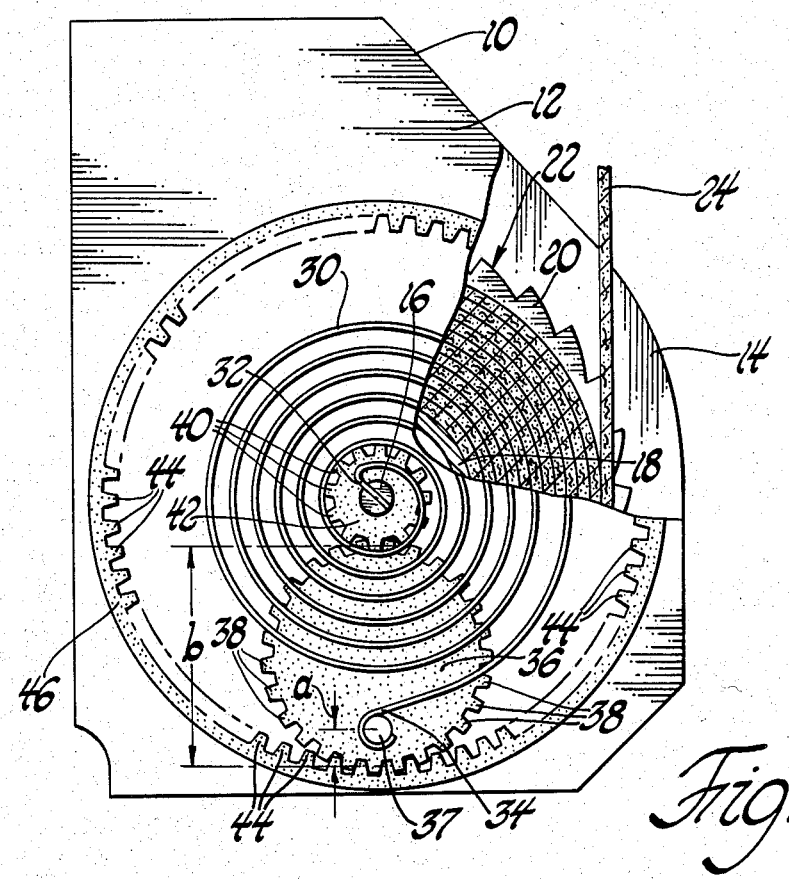
FIG. 1 is a side elevation view of a seat belt retractor embodying the winding spring arrangement of this invention and showing the belt fully retracted by the retractor.

Referring to FIG. 1, there is shown a conventional seat belt retractor including a frame 10 having laterally spaced apart side walls 12 and 14. A reel shaft 16 has its ends rotatably journaled in apertures of the side walls 12 and 14 and carries a sleeve 18 having laterally spaced apart ratchet plates, one of which is shown at 20, carried thereon to define a belt reel 22. A seat belt 24 has its end anchored to the sleeve 18 and exits from the retractor 10 for buckling about a seated occupant to restrain the occupant in the vehicle seat.

A winding spring arrangement is provided to bias the belt reel 22 in the clockwise belt winding direction of rotation. The windup spring 30 is a clock or spiral spring and has its inner end 32 seated in a slot in the end of the reel shaft 16. The outer end 34 of the windup spring 30 is mounted on a planetary gear 36 by an anchor pin 37. The planetary gear 36 has gear teeth 38 which mesh with teeth 40 of a sun gear 42 mounted on the end of the reel shaft 16 for unitary rotation therewith. The gear teeth 38 of the planetary gear 36 also mesh with gear teeth 44 of a ring gear 46 mounted on the frame side wall 12.

Figure 2:
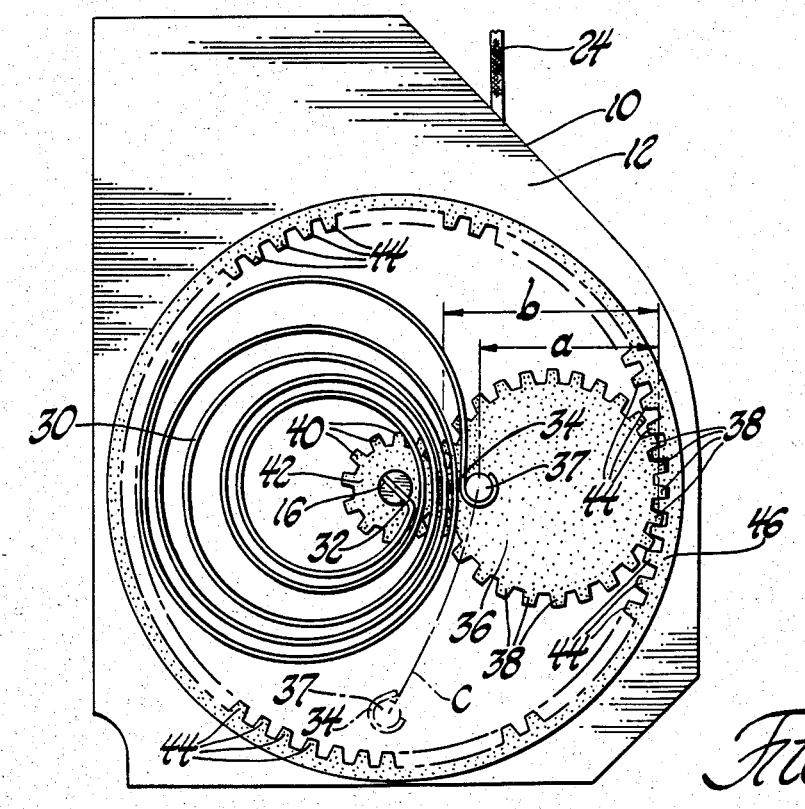
FIG. 2 is a view similar to FIG. 1 but showing the retractor with the belt fully extended therefrom and the retractor and buckled in its normal restraining position about a seated occupant.

FIG. 1 shows the belt fully retracted by the retractor 12 and accordingly wound in several layers upon the reel 22. When the vehicle occupant extends the belt 24 from the retractor in order to buckle the belt in a restraining position, the unwinding of the belt 24 from the reel 22 induces a plurality of revolutions of the reel 22 in the counterclockwise belt unwinding direction of rotation. Typically, such unwinding may involve 12 revolutions of the reel 22. The inner end 32 of the windup spring 30 and the sun gear 42 rotate in unison with the reel 22. As the belt unwinding rotation proceeds, the windup spring 30 is progressively wound up around its inner end 32 and the counterclockwise rotation of the sun gear 42 drives the planetary gear 36 in a clockwise direction of rotation. FIG. 2 shows the retractor with the seat belt 24 having been fully extended from the retractor and unwound from the reel 22. Thus, the sun gear 42 will have made a plurality of revolutions in the counterclockwise unwinding direction with the result that the planetary gear 36 has rotated approximately 180° around its center but has also been bodily translated through about 90° in the counterclockwise direction with respect to the sun gear 42.

Referring again to FIG. 1, it will be understood that the inner end 32 of the spring is urging rotation of the reel 22 in the clockwise belt winding direction. Simultaneously, the outer end 34 of the spring 30 is acting upon the planetary gear 36 in a direction to urge clockwise rolling rotation of the planetary gear 36 about its center which would in turn cause the planetary gear 36 to roll along the ring gear 46. Thus, as viewed in FIG. 1, the planetary gear 36 imparts a counterclockwise force on the sun gear 42 in opposition to the clockwise belt winding bias supplied therein by the inner end 32 of the windup spring 30. However, because the anchor pin 37 is spaced from the ring gear 46 by a distance "a" which is very small compared to the overall effective length "b" represented by the diameter of the planetary gear 36, the force of the windup spring acting on the anchor pin 37 will provide a relatively small belt unwinding counterclockwise torque on the sun gear 42 in accordance with the formula: Torque=spring force multiplied by a/b.

In comparing FIG. 1 with FIG. 2, it will be understood that the progressive unwinding of the belt 24 from the retractor will cause the anchor pin 37 to migrate from its phantom line indicated position of FIG. 2 to the solid line indicated position along the path designated "c". Thus, the outer end 34 of the windup spring 30 may be seen as chasing the inner end 32 of the windup spring 30 in its counterclockwise movement so that the force exerted by the windup spring 30 is less than would otherwise result had the outer end 34 remained fixed at its location of FIG. 1. Furthermore, as seen in FIG. 2, the rolling motion of the planetary gear 36 along the ring gear 46 and the 180° rotation of the planetary gear about its center has translated the anchor pin 37 to a position substantially closer to the sun gear 42. Thus, as shown in FIG. 2, while the inner end 32 of the windup spring 30 is acting on the reel 22 to induce clockwise belt winding rotation of the reel, the outer end 34 of the windup spring 30 is acting through the lever arm provided by planetary gear 36 to induce a counteracting force inducing counterclockwise unwinding rotation of the reel 22. The magnitude of this opposing torque is: Torque=spring force times a/b where "a" has now become nearly as great as "b" so that the opposing force is substantially greater than had existed in the fully wound belt condition of FIG. 1.

Thus, it will be appreciated that the belt winding bias provided on the seat belt 24 by the windup spring 30 is less with the belt unwound to its extended position of FIG. 2 than would conventionally result from the fixed mounting of the outer end of a windup spring 30 upon the retractor frame 10.

DESCRIPTION OF A SECOND EMBODIMENT

Figure 3:
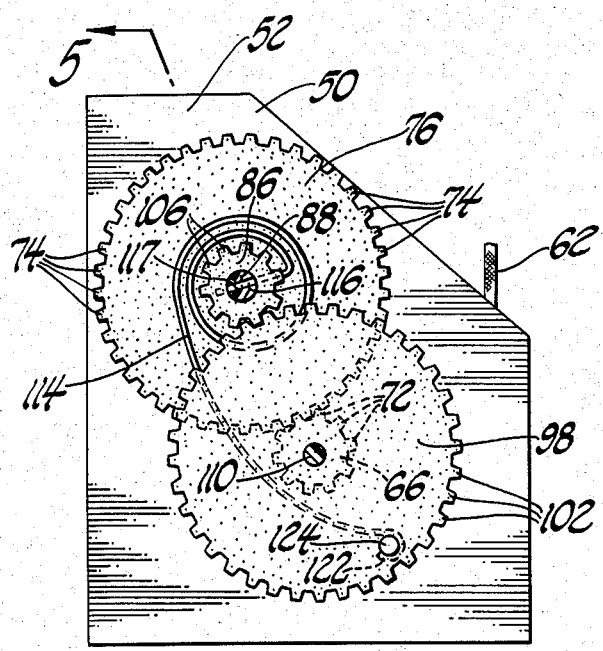
FIG. 3 is a side elevation view of a second embodiment of the winding spring arrangement of this invention and showing the belt fully retracted upon the retractor.
Figure 4:
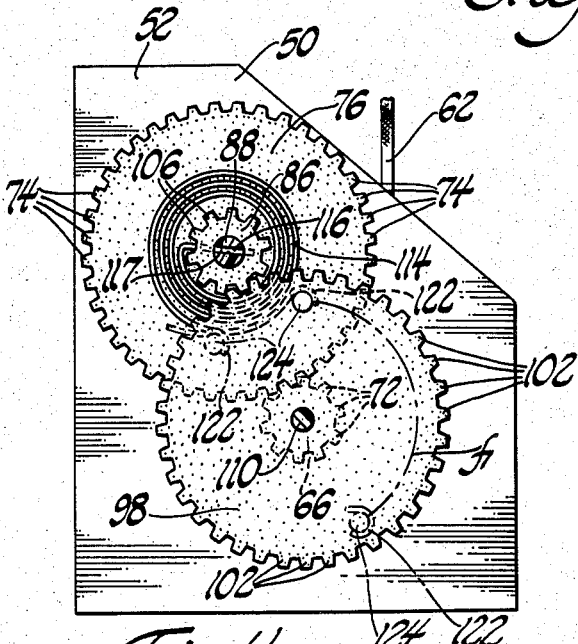
FIG. 4 is a view similar to FIG. 3 but showing the retractor with the belt fully extended and buckled in its restraining position about the occupant.
Figure 5:
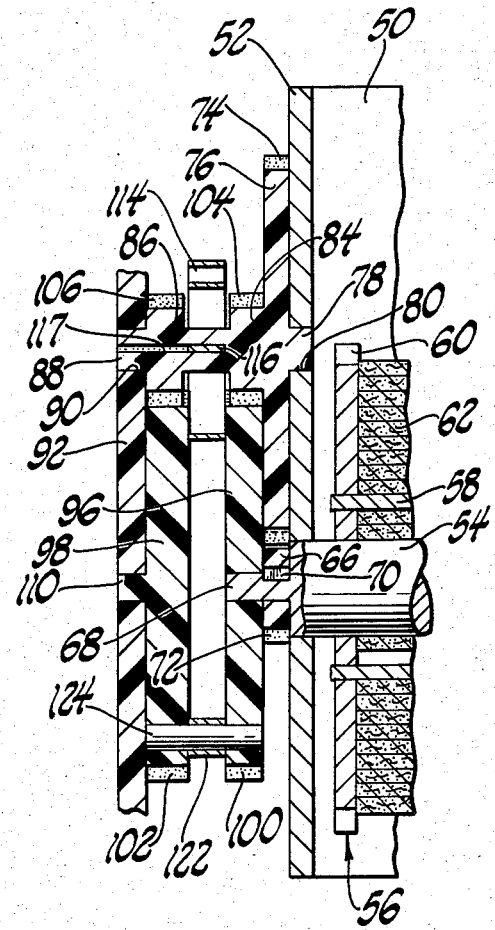
FIG. 5 is a sectional view in the direction of arrows 5—5 of FIG. 3.

FIGS. 3, 4 and 5 disclose a second embodiment of the invention. As seen in FIGS. 3 and 5, the retractor includes frame 50 having a side wall 52 supporting a reel shaft 54 rotatably mounting a reel 56 comprised of sleeve 58 and toothed ratchet plate 60 and having the seat belt 62 attached thereto.

As best seen in FIGS. 3 and 5, input pinion 66 is mounted on the necked down end 68 of the reel shaft 54 by a spline 70. The input pinion 66 has gear teeth 72 which mesh with gear teeth 74 of an idler gear 76 mounted rotatably on the retractor side wall 52 by an integral pivot boss 78 thereof extending into an aperture 80 in the side wall 52. The idler gear 76 is preferably constructed of injected molded plastic and is integral with a pair of reaction pinions 84 and 86 which rotate in unison therewith. A pivot boss 88 is integral with the reaction pinion 86 and extends through an aperture 90 in a support wall 92 to assist in the rotatable mounting of the idler gear 76 and the reaction pinions 84 and 86.

As best seen in FIG. 5, a pair of spring carrier gears 96 and 98 respectively have gear teeth 100 and 102 which mesh with gear teeth 104 and 106 carried respectively by the reaction pinions 84 and 86. The spring carrier gear 96 is rotatably mounted on the necked down end portions 68 of the reel shaft 54. The spring carrier gear 98 is rotatably mounted on the support wall 92 by an integral boss 110 thereof.

A spiral windup spring 114 has an inner end 116 which seats in a slot 117 to anchor the inner end 116 of the windup spring 114 between the reaction pinions 84 and 86. The outer end 122 of the windup spring 114 is mounted on an anchor pin 124 which extends between the spring carrier gears 96 and 98.

FIG. 3 shows the belt fully retracted by the retractor and accordingly the belt is wound in several layers upon the reel 56. When the vehicle occupant extends the belt 62 from the retractor in order to buckle the belt in a restraining position, the unwinding of the belt 62 from the reel 56 induces a plurality of revolutions of the reel 56 in the counterclockwise belt unwinding direction of rotation. Typically such unwinding may involve about 12 revolutions of the reel 56. The input pinion 66 rotates in unison with the reel 56 and in turn rotates the idler gear 76 and the reaction pinions 84 and 86 so that the inner end 116 of the spiral spring 114 is progressively wound up round its inner end 116. The rotation of the reaction gears 84 and 86 simultaneously rotates the spring carrier gears 96 and 98. FIG. 4 shows the retractor with the seat belt 62 having been fully extended from the retractor so that the reduction ratio provided by the input pinion 66, the idler gear 76, the reaction pinions 84 and 86, and the spring carrier gears 96 and 98 will have rotated the spring carrier gears approximately 180° so that the outer end of the windup spring 114 will have been bodily translated from its FIG. 3 position diametrically opposed to the inner end 116 of the windup spring 114 to its position of FIG. 4 in which the outer end 122 of the windup spring 114 is substantially closer to the inner end of the windup spring. During this motion of the outer end of the windup spring 122 along the path designated "f", the outer end of the spring will have chased after the inner end of the spring to reduce the torque which the spring would otherwise have provided to the reel had the outer end 122 of the spring remained fixed at its location of FIG. 3.

As seen in FIG. 4, the inner end 116 of the spring 114 is urging counterclockwise rotation of the reaction pinions 84 and 86 and the idler gear 76 which act to rotate the input pinion 66 and the reel 56 in the clockwise belt winding direction so that a retracting force is applied on the belt 62. At the same time, however, the outer end 122 of the spring 114 is urging a counterclockwise rotation of the spring carrier gears 96 and 98 which, in turn, induces a clockwise rotation of the reaction pinions 84 and 86 in opposition to the counterclockwise torque applied thereto by the inner end 116 of the spring 114. However, because the outer end 122 of the spring 114 is diametrically opposite from the reaction pinions 84 and 86, the largest part of the force acting on the spring carrier gears 96 and 98 is taken through their respective mountings on the necked down end 68 of the reel shaft and the support 92 so that the torque acting on the reaction pinions 84 and 86 will be relatively small. However, as seen in FIG. 4, the rotation of the spring carrier gears 96 and 98 to their position of FIG. 4, has moved the outer end of the spring 122 substantially closer to the reaction pinion 84 and 86 than to the center of rotation of the spring carrier gears provided by the necked down reel shaft end 68 and the boss 110. Thus, the larger component of the spring force is communicated to the reaction pinions 84 and 86 to provide a more substantial clockwise torque upon the reaction pinions in opposition to the counterclockwise torque provided thereto by the inner end 116 of the windup spring 114.

Figure 6:
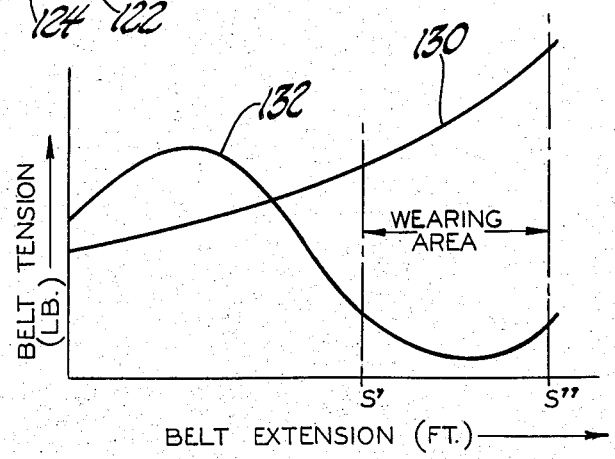
FIG. 6 is a graph showing the tension on the belt versus the distance by which the belt is extended from the reel.

Referring to FIG. 6, there is shown a graph of belt tension in pounds or Newtons versus the extension of the belt from the retractor in feet or meters. The curve designated 130 represents the belt tension experienced in the normal prior art type of retractor in which the inner end of the spiral spring is attached to the reel shaft and the outer end of the spring is grounded on the reel frame. Such a retractor is described more fully in the Background of the Invention. The plot designated 132 shows the type of belt tension characteristic which can be obtained by the winding spring arrangement of this invention. In particular, the tension on the belt starts out relatively high but then decreases to provide a lesser belt tension when the belt has been extended to a range of belt extension in which the belt is worn by the occupant. The plot of belt tension versus belt extension can, of course, be modified by changing the gear reduction ratio obtained by the planetary gear set of FIGS. 1 and 2 or the gear reduction set of FIGS. 3, 4 and 5. The gear ratio shown in the drawings is merely representative and, for sake of clarity, shows the sun gear 42 larger in relation to the spring carrier gear 98 than would be used in an actual retractor.

Thus, it is seen that the invention provides a new and improved winding spring arrangement for a seat belt retractor in which the spring induced belt tension is gradually reduced during belt unwinding by virtue of having the outer end of a spiral belt windup spring chase after the inner end and also coupled to the reel by a gear arrangement by which the outer end of the spring induces a torque upon the reel in opposition to the torque applied thereto by the inner end of the spring.

The embodiments of the invention in which an exclusive property or privilege is claimed are defined as follows:

1. A winding spring arrangement for a seat belt retractor having a belt reel rotatably mounted on a housing by a reel shaft for belt winding and unwinding reel rotation through a plurality of reel revolutions during travel of the belt from the fully wound condition on the reel to a condition extended fully therefrom, said winding spring arrangement comprising:
   a spirally wound spring having a first end drive coupled to the reel shaft to that the first end is wound and unwound through a plurality of revolutions during the winding and unwinding of the belt from the reel and a second end;
   gear means coupled to the reel by a gear reduction set by which the gear means makes less than one revolution during the plurality of revolutions of the reel during belt winding and unwinding; and
   means connecting the second end of the spirally wound spring to the gear means at a point thereon which migrates relative to the first end of the spiral spring from a point generally distant the first end to a point generally closer to the first end to thereby reduce the torque applied to the reel by the spring during the progressive unwinding of the belt from the reel.

2. A winding spring arrangement for a seat belt retractor having a belt reel rotatably mounted on a housing by a reel shaft for a plurality of revolutions to wind and unwind the belt relative the reel comprising:
   a sun gear carried by the reel shaft;
   a ring gear fixedly mounted on the housing and encircling the sun gear;
   a planetary gear interposed between and meshing with the sun gear and the ring gear and having a diameter selected relative to the diameters of the sun gear and the ring gear to effect revolution of the planetary gear less than a full revolution during the plurality of revolutions of the sun gear during belt winding and unwinding; and
   a spirally wound spring having a first end mounted on the reel shaft and a second end mounted on the planetary gear at a point thereon which migrates in the belt unwinding direction of reel rotation from a point thereon diametrically most opposite to the sun gear to a point closest adjacent the sun gear so that the second end of the spring chases the first end of the spring during belt unwinding rotation and also acts through the planetary gear to provide a progressively effective force on the shaft counteracting the torque of the spirally wound spring.

3. A winding spring arrangement for a seat belt retractor having a belt reel rotatably mounted on a housing by a reel shaft for belt winding and unwinding reel rotation through a plurality of reel revolutions during travel of the belt from the fully wound condition on the reel to a condition fully extended therefrom, said winding spring arrangement comprising:

a spirally wound spring having a first end and a second end, said first end being drive coupled to the reel shaft so that the first end is wound up during belt unwinding reel rotation and energy is stored therein to provide a belt rewinding bias on the reel shaft to rewind the belt;

gear means associated with the reel shaft and including a first small size gear drive coupled with the reel shaft and a second larger size gear meshing with the first gear for synchronous rotation at a substantially slower speed than the first gear; and means anchoring the second end of the spiral wound spring on the second gear at a point thereon which, when the belt is fully wound is spaced relatively distant from the first gear so that the tension of the spring acting on the second gear via the second gear provides a relatively small magnitude torque acting on the first gear in a direction opposite to the reel winding bias provided thereon by the first end of the spring and as belt unwinding proceeds the anchor moves progressively closer to the first gear so that the force of the tension spring provides a progressively increasing torque acting on the first gear via the second gear to increasingly counteract the winding bias of the inner spring acting on the first gear thereby the winding effort acting on the belt may be lesser when the belt reaches the fully extended position than had occurred when the belt was fully retracted.

* * * * *